(12) United States Patent
Dirscherl et al.

(10) Patent No.: US 7,457,365 B2
(45) Date of Patent: Nov. 25, 2008

(54) CIRCUIT ARRANGEMENT HAVING A TRANSMITTER AND A RECEIVER

(75) Inventors: Gerd Dirscherl, Munich (DE); Norbert Janssen, Munich (DE)

(73) Assignee: Infineon Technologies AG (DE)

( * ) Notice: Subject to any disclaimer, the term of this patent is extended or adjusted under 35 U.S.C. 154(b) by 629 days.

(21) Appl. No.: 10/923,198

(22) Filed: Aug. 20, 2004

(65) Prior Publication Data

US 2005/0031017 A1    Feb. 10, 2005

Related U.S. Application Data

(63) Continuation of application No. PCT/DE03/00774, filed on Mar. 11, 2003.

(30) Foreign Application Priority Data

Mar. 28, 2002    (DE)    .................. 102 14 118

(51) Int. Cl.
 *H04L 27/00*    (2006.01)
(52) U.S. Cl. .......................... 375/259
(58) Field of Classification Search ............ 375/259, 375/260, 295, 299, 310, 349, 133, 316
See application file for complete search history.

(56) References Cited

U.S. PATENT DOCUMENTS

| 2,101,224 | A |   | 12/1937 | Osborne et al. |
|---|---|---|---|---|
| 5,280,497 | A |   | 1/1994 | Levitan |
| 5,448,643 | A | * | 9/1995 | Parker .................... 380/59 |
| 6,556,628 | B1 | * | 4/2003 | Poulton et al. ............ 375/257 |
| 2003/0086503 | A1 | * | 5/2003 | Rennert et al. ............ 375/260 |

FOREIGN PATENT DOCUMENTS

| DE | 38 07 418 A1 | 9/1989 |
|---|---|---|
| DE | 195 09 602 C1 | 5/1996 |
| DE | 197 37 359 A1 | 3/1999 |
| DE | 198 31 562 A1 | 1/2000 |
| EP | 0 981 115 A2 | 2/2000 |
| EP | 1 039 669 A2 | 9/2000 |
| WO | WO-99/59293 A1 | 11/1999 |

\* cited by examiner

*Primary Examiner*—Sam K Ahn
(74) *Attorney, Agent, or Firm*—Dickstein, Shapiro, LLP.

(57) ABSTRACT

Circuit arrangement having a transmitter and a receiver coupled to the transmitter via N signal lines, wherein a useful information signal is exchanged between the transmitter and the receiver via M randomly selectable signal lines, N being greater than M.

9 Claims, 1 Drawing Sheet

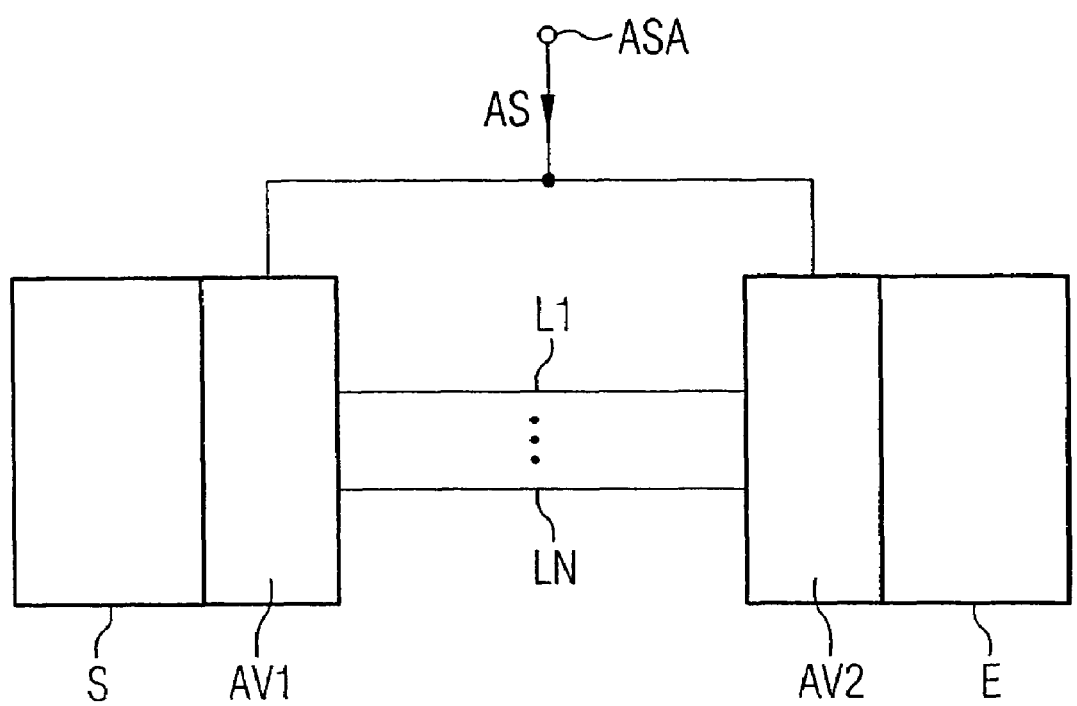

CIRCUIT ARRANGEMENT HAVING A TRANSMITTER AND A RECEIVER

CROSS-REFERENCE TO RELATED APPLICATION

This application is a continuation of International Patent Application Ser. No. PCT/DE03/00774, filed Mar. 11, 2003, which published in German on Oct. 9, 2003 as WO 03/084120, and is incorporated herein by reference in its entirety.

FIELD OF THE INVENTION

The invention relates to a circuit arrangement having a transmitter and a receiver.

BACKGROUND OF THE INVENTION

In such circuit arrangements, the transmitter and receiver are interconnected via at least one signal line via which it is possible to exchange an item of useful information. During the transmission of the useful information, a current or radiation profile typical of the respective data is produced. If success is achieved in evaluating this current and/or radiation profile, it is possible to draw conclusions on the transmitted data and/or the functional set up of the circuit arrangement. Consequently, in designing circuit arrangements a high value is placed on avoiding data-dependent switching processes in the electronic circuit, which comprises, inter alia, the transmitter and the receiver.

Two different methods, inter alia, are known which can be used to analyze current profiles.

The differential current profile analysis (differential power analysis, dpa) is one of the most important methods for tackling circuit arrangements with regard to confidential information such as passwords or cryptographic keys. In this case, in conjunction with a prescribed program and/or a prescribed algorithm statistical methods are used to evaluate measured current profiles and/or their charge integrals of the circuit arrangement which are calculated over one or more clock cycles. Given a sufficiently large number of program runs, a conclusion can be drawn on the information to be protected from the correlation of a systematic data variation and the respective charge integral.

In order to complicate spying on the data, circuit arrangements are therefore executed using so called dual-rail technology. By contrast with conventional circuit arrangements using so called single-rail logic, in the case of which each bit within a data and signal path is represented physically by exactly one electric node, each bit is represented by two nodes k and kq in the implementation using dual-rail logic. The bit then has a valid logic value when k corresponds to the true logic value b of this bit and kq corresponds to the negated value bn=not (b).

The desired invariance of the charge integrals is achieved by inserting between in each case two states with valid logic values (b, bn)=(1,0) or (0,1) a so-called precharge state for which both the node k and the node kq are charged to the same electric potential. The nodes or signal lines consequently assume logically invalid values (1,1) or (0,0).

It holds for each such arbitrary state sequences that at each transmission from a precharge state to a logically valid value exactly one node is recharged from "1" to "0", and at each transition from a logically favorable value to a precharge state exactly one node is recharged from "0" to "1". This is independent of the logically valid value b of a respective flag bit. It follows from this that the charge integrals corresponding to these state sequences are independent of the sequence of the logically valid values (b, bn), provided it is ensured that the nodes k and kq have the same electrical capacitances. The current profile of a data path implemented in such a way is therefore not a function of the time variation in the data to be processed. Differential power analysis cannot be used to spy on data in a circuit arrangement having dual-rail logic.

However, a disadvantage of the dual rail logic is an increased area requirement, a high current and a lower performance owing to the precharging phase required between two state sequences. On the other hand, it is possible to draw a conclusion on the transmitted data from the radiation profile by recharging the signal lines.

Another method for preventing current profile analysis is the so called switched capacitor method. In the case of this method, each signal line is connected to a charge store which is connected to the signal line, as the case may be, via a circuit arrangement evaluating the useful information. Although it is possible thereby to smooth out the current profile, it is, however, still possible as before to analyze the useful information and, if appropriate, to draw a conclusion on the mode of operation of the circuit arrangement by means of a radiation analysis.

SUMMARY OF THE INVENTION

It is therefore an object of the present invention to specify a circuit arrangement in which the useful information exchanged between a transmitter and a receiver cannot be analyzed either by means of a current profile analysis or by means of a radiation analysis.

It is provided according to the invention to couple the transmitter to the receiver via N signal lines, it being possible to exchange an item of useful information between the transmitter and receiver via M randomly selectable signal lines, N being greater than M.

By analogy with the dual-rail logic described at the beginning, $N \geq 2$ signal lines are used for signal carrying, that is to say transmitting the useful information. According to the invention, which signal line carries the useful information is selected randomly.

The simplest case of N=2 resembles the dual-rail logic. Whereas in the case of the dual-rail logic a specific signal line transmits the information-containing useful signal, and the other signal line basically carries the complementary useful information, in the case of the invention that signal line which carries the actual useful information is randomly selected. The circuit arrangement therefore complicates even analyses in the case of which signal lines are tapped by means of probing. Analysis by means of electronmicroscopy can likewise be used only with difficulty for analyzing the circuit arrangement. By contrast with the dual-rail logic, the circuit arrangement according to the invention further has the advantage that the performance increases given the same clock frequency. The performance gain results from the fact that the precharging phase between two state sequences is eliminated. There is a corresponding reduction in the current consumption by comparison with the dual rail logic in conjunction with the same performance.

The circuit arrangement according to the invention is suitable both for transmitting individual signals, for bus systems and for digital circuits.

The random selection of the M signal lines is preferably performed by means of a selection signal fed to the transmitter and the receiver. This random selection signal is generated in a circuit arrangement outside the transmitter and the receiver and fed thereto. The selection signal is used in the transmitter to fix via which M signal lines the useful information is transmitted. So that the receiver can evaluate the transmitted useful information completely, it likewise requires the information as to via which of the M signal lines the transmission is performed.

The transmitter therefore preferably has a first selection device, which is connected to the signal lines and which is fed the selection signal via a selection line. In a corresponding way, the receiver has a second selection device, which is connected to the signal lines and is likewise fed the selection signal via the selection line. The first selection device applies at least one of the M signal lines with the useful information as a function of the selection signal. Since the second selection device is likewise fed the selection signal, the receiver has the information as to via which signal line or lines the useful information has been transmitted, and can process this information correspondingly.

The selection signal is preferably transmitted at regular intervals to the first and second selection device. In principle, the transmission of the useful information could be performed via different M randomly selected signal lines with each clock cycle. However, the change for which M signal lines transmit the data can also be performed at other temporarily periodical or irregular intervals.

A random signal is preferably applied to the signal lines not carrying a useful signal. It is particularly advantageous when the current consumption caused by the useful information and the random signals is constant. In this case, a current profile analysis of the circuit arrangement would run into the sands.

In a preferred refinement of the invention, the number M of the randomly selectable signal lines is "1". The total number N of the signal lines is preferably "2", the complementary value of the useful signal being applied to the signal line not carrying a useful signal.

This arrangement resembles dual-real technology in principle. As already mentioned at the beginning, the method according to the invention differs from dual rail technology, however, in that the useful information is not transmitted permanently via the same signal line. This substantially complicates an analysis of the transmitted data with the aid of the methods known from the prior art.

The invention is explained in more detail with the aid of the exemplary embodiment described below.

BRIEF DESCRIPTION OF THE DRAWINGS

The FIGURE shows a circuit arrangement having a transmitter and a receiver.

DETAILED DESCRIPTION OF THE PREFERRED MODE OF THE INVENTION

The sole FIGURE shows a circuit arrangement having a transmitter S and a receiver E. By way of example, the transmitter S and the receiver E are interconnected via two lines L1, LN. In principle, the number of the signal lines is arbitrary. The total number N depends, in the final analysis, on how sensitive the information is which the transmitter S is to transmit to the receiver E.

In addition to its function as data transmission unit, the transmitter S can have any desired function in principle. In particular, it is conceivable for the transmitter S to have a memory in which secret keys or cryptographic data are stored. Likewise, it could have circuit elements that execute arithmetic operations in order to transmit the result to the receiver E. However, the information to be transmitted by the transmitter S could also be transmitted to the transmitter S by a circuit block located outside the latter. The data transmission can be performed in this case in the inventive way or only via a single line or a system. In a corresponding way, the functionality of the receiver E can go beyond the function as a data receiving and evaluation unit. There are no restrictions of any sort in this regard.

The transmitter S has a selection device AV1 that can be fed a selection signal AS. In a corresponding way, the receiver E has a second selection device AV2, to which the selection signal AS is likewise applied.

The selection signal AS can be generated by a circuit block outside the circuit arrangement shown, and be fed to the respective selection devices AV1, AV2 via a terminal ASA.

The exemplary embodiment shown constitutes the simplest case of the invention. The useful information is preferably transmitted via two complementary signals between the transmitter S and the receiver E. Depending on the selection signal AS, the first selection device AV1 decides via which of two signal lines L1, LN the actual useful information is transmitted. The second selection device AV2 of the receiver E is enabled by knowledge of the selection signal AS to select the signal line carrying information and to feed the transmitted useful information to the receiver.

The selection device can consist, for example, of an exclusive-or-gate. The first input of this gate is then fed the selection signal AS, and the second input terminal is fed the signal to be transmitted by the transmitter S. As a function thereof, a statement is obtained as to which of the signal lines is transmitting the useful information. The second selection device AV2 is preferably designed as an inverse output function. The selection device could also be designed as an equivalence operation.

The larger the number N of the signal lines connected between the transmitter S and the receiver E, the larger the security against analyses by a third party. It is particularly preferred when the current profile never changes - independently of the useful information transmitted. This means in concrete terms that given a total number of N signal lines, a first logic state is applied to X signal lines, while a second logic state is applied to Y signal lines and X+Y=N. In the case of such an arrangement, a current profile analysis would not supply conclusions on the data transmitted or on the circuit design.

The invention also has the advantage that the circuit arrangement can be synthesized.

The invention claimed is:

1. A circuit arrangement comprising:
   a transmitter; and
   a receiver coupled to the transmitter via N signal lines, wherein a useful information signal is exchanged between the transmitter and the receiver via M randomly selectable signal lines of the N signal lines, N being greater than M wherein a random signal is applied to the signal lines not carrying the useful information signal and N and M are integers.

2. The circuit arrangement as claimed in claim 1, wherein the random selection of the M signal lines is performed via a selection signal fed to the transmitter and the receiver.

3. The circuit arrangement as claimed in claim 1, wherein the transmitter has a first selection device, which is connected to the signal lines and which is fed the selection signal via a selection line.

4. The circuit arrangement as claimed in claim 3, wherein the receiver has a second selection device, which is connected to the signal lines and which is fed the selection signal via the selection line.

5. The circuit arrangement as claimed in claim 4, wherein the selection signal is transmitted at regular intervals to the first and second selection devices.

6. The circuit arrangement as claimed in claim 1, wherein the number M of the randomly selectable signal lines is "1".

7. The circuit arrangement as claimed in claim 6, wherein the number N of the signal lines is "2", and a complementary value of the useful information signal is applied to the signal line not carrying the useful information signal.

8. The circuit arrangement as claimed in claim 1, wherein a current consumption caused by the useful information and the random signals is constant.

9. A circuit arrangement comprising:

a transmitter; and a receiver coupled to the transmitter via N signal lines, wherein a useful information signal is exchanged between the transmitter and the receiver via M randomly selectable signal lines of the N signal lines, N being greater than M, wherein a signal is applied to the signal lines not carrying the useful information signal in such a way that the number of the signal lines to which a first logic state is applied and the number of the signal lines to which a second logic state is applied do not change and N and M are integers.

* * * * *